United States Patent [19]

Lange et al.

[11] 3,895,996
[45] July 22, 1975

[54] BENEFICIATION OF LIGNIN SOLUTIONS AND PULP MILL WASTES

[75] Inventors: K. Robert Lange, Huntington Valley; Arthur M. Stern, Morrisville; Lawrence L. Gasner; Yuan Tsun Hsu, both of Cornwells Heights, all of Pa.

[73] Assignee: Betz Laboratories, Inc., Trevose, Pa.

[22] Filed: June 22, 1973

[21] Appl. No.: 372,889

Related U.S. Application Data

[62] Division of Ser. No. 277,006, Aug. 1, 1972, Pat. No. 3,829,252.

[52] U.S. Cl............................. 162/16; 260/124 R
[51] Int. Cl.².................... D21C 11/00; C07G 1/00
[58] Field of Search.................... 162/16; 260/124 R

[56] References Cited
UNITED STATES PATENTS

| | | | |
|---|---|---|---|
| 2,505,457 | 4/1950 | Bird | 260/124 R |
| 3,232,925 | 2/1966 | King et al. | 260/124 R |
| 3,387,965 | 6/1968 | Shigeo et al. | 162/16 |
| 3,505,243 | 4/1970 | Steinberg et al. | 260/124 R |

FOREIGN PATENTS OR APPLICATIONS

| | | | |
|---|---|---|---|
| 145,742 | 7/1920 | United Kingdom | 260/124 R |

Primary Examiner—Lewis Gotts
Assistant Examiner—D. R. Phillips
Attorney, Agent, or Firm—Alexander D. Ricci

[57] ABSTRACT

The present disclosure is directed primarily to a method of producing valuable products from aqueous solutions of lignin and lignin derivatives. Aqueous solutions of the lignin and derivatives thereof are available as commercial solutions, can be made from solids or semi-solid mixtures thereof or are available as waste effluents from pulp producing mills.

With respect to the latter source, the inventive method not only permits the obtention of valuable products therefrom, but also reduces the amount of non-biodegradable and toxic materials normally contained therein to be eliminated prior to discharge. In addition, the method reduces the color of the final discharge. Basically, the method entails the addition to the lignin or lignin derivative solution of a polyvalent metal salt, the cation of which will react with a portion of the lignin solution to produce a water-insoluble precipitate, acidification of the precipitate and final treatment with a basic solution. The final products possess utilities as scale and precipitate agents for aqueous systems, namely steam producing and cooling water systems.

10 Claims, No Drawings

BENEFICATION OF LIGNIN SOLUTIONS AND PULP MILL WASTES

This is a division of application Ser. No. 277,006 filed Aug. 1, 1972, now U.S. Pat. No. 3,829,252.

BACKGROUND OF THE INVENTION

As set forth above, the object of the present invention is to produce valuable products from aqueous solutions of lignin or its derivatives. These aqueous solutions may be obtained commercially as available products, may be made from concentrated, solid or semisolid portions of the lignin and lignin derivatives or may be obtained directly as the waste from a paper pulp producing operation or plant. The first two of the described sources need little explanation. A better description of the third source might perhaps prove helpful in understanding the most important aspects of the invention.

Pulping processes such as Kraft pulping (also referred to as sulfate pulping) and sulfite (neutral and acid forms) pulping, although somewhat different in process, steps and materials used, possess what may be called a common problem-causing disadvantage. As is well-known, both pulping processes give rise to waste by-products which must be dealt with effectively. Current legislation on the municipal, state and federal levels has prohibited or at least qualified the type effluent which may be discharged to natural waterways. Accordingly, the pulp and paper industry is faced with the problem of providing for the effective pretreatment of waste streams and products prior to their discharge. This problem is complex technically because these wastes are extremely resistant to biodegradation and thus are not amenable to conventional biological treatment methods. In fact, lignin wastes retard the normal biodegradation processes since aromatics such as phenols which are contained in the lignin wastes are not only extremely difficult to biodegrade, but in most cases are also toxic to the organisms which are responsible for biodegradation. Accordingly, their presence is regressive in this respect. In addition, the wastes are highly colored and therefore objectionable from this standpoint. Adsorption or precipitation techniques of removal which are currently used must be exceptionally efficient to accomplish adequate removal. High treatment levels and correspondingly high losses during adsorbent or precipitant recovery contribute to the high cost of these methods. As is apparent, if there is a cost incurred in providing for the disposal of wastes from the pulping process, then the cost of the pulp derived must necessarily reflect this cost. As can be appreciated from the knowledge of the amount of pulp produced, the amount of waste lignin produced is extremely large. For example, in 1967 the average Kraft mill output was 400 tons of paper per day with the concomitant generation of 192 tons of waste lignin per day. It is presently estimated that by 1977 these figures will be double. Nationally, this would mean that in 1977 there would be an estimated production level of over $29 \times 10^6$ tons of paper with a corresponding discharge of $14 \times 10^6$ tons of waste lignin into various bodies of water serving as waste diluents. To merely treat that volume of waste water with any chemical prior to its disposal obviously would require a huge expenditure.

As earlier indicated, the major problem in the effluents or wastes from the pulp mill is their high content of lignin, a natural wood polymer that is extremely resistant to biodegradation and which imparts a black color to any diluent to which it is added. "Lignin" is the major non-carbohydrate constituent of wood and woody plants and it comprises between 18% and 38% of the mass of such vegetation. Lignin functions as a natural plastic binder for the cellulose fibers and is stated to be, composition-wise, a polymeric substance of substituted aromatics. Since in the pulp and paper industry lignin containing materials such as wood, straw, cornstalks and other vegetable and plant tissues are processed to recover the cellulose or pulp, the plastic binder or, more specifically, the lignin, is obtained as a by-product together with aromatic compounds of the phenol type. Since the quantity of lignin obtained in the production of pulp is extremely large, considerable effort has been expended to find ways to utilize the chemical values of this material. While there is some variation in the chemical structure of lignin products and the aromatic compounds from different origins (because of differences between species of woods used in the pulping process, differences in the processes themselves and differences in the techniques used to recover lignin), the basic structure and properties of all lignins and the aromatics for the purpose of this invention may be considered to be similar.

Since lignin and its derivatives are the most predominant in contributing to the color of the wastes or the discharge from a pulping process, considerable effort and money has been expended by the pulping industry to develop various processes for either or both the removal and/or conversion of lignins so as to produce a more acceptably colored discharge or waste. Many processes have been proffered but few have met with success. For example, it is well-known that the addition of lime to the pulping effluent will result in the precipitation of colored bodies; however, the process is costly.

Activated carbon, which also removes colored materials by adsorption, possesses the same disadvantage. Some attempts have been made to combine the massive lime and activated carbon techniques but the costs remain high. Neither of these treatments incorporates any concept of obtaining utilizable products, the value of which could offset the high costs of treatment or provide for a return on invested capital.

Summarizing the above, it may be stated that the conventional secondary treatments fail to reduce the problem since the lignin constituents of these wastes are not biodegradable and effluents remain unacceptably colored. Thus far, only three functional methods have been proposed for removing color from pulp and paper mill effluents. These involve the application of massive lime, activated carbon or a combination of both. All possess the disadvantages of (1) high cost, (2) continuous need for solids disposal and/or regeneration of reactant, and (3) no provision for return on invested funds.

Upon undertaking the task of developing a suitable process for the treatment of pulping discharges, the present inventors were aware that the process must in fact be simple, expedient and economical. If in fact the process were not economical, then there had to be an imaginative ramification to hopefully allow the process to be at least self-supporting economically. Of course, the most desirable objective would be to provide a process which would not only effectively remove the colored constituents of the waste, but one which also would effect the concurrent removal of the toxic constituents. Most advantageously, the separated products would also be valuable and utilizable materials. The latter is in fact what the present inventors have accomplished.

GENERAL DESCRIPTION OF THE INVENTION

Generally, the proposed approach involves the initial precipitation of the lignin, lignin derivatives and aromatic compounds from an aqueous solution thereof. The precipitation is effectuated by utilizing the water-soluble salt of a polyvalent cation, which cation, under the specific conditions disclosed in more detail later, forms a water-insoluble precipitate with certain portions of the aqueous solution. The precipitate formed after separation is acidified with preferably a mineral acid, digested and subsequently treated with a basic material in a basic environment.

The final product when prepared from a commercially available lignin or lignin derivative has been found to be more effective as a scale control agent in aqueous systems, e.g. steam producing systems and cooling water systems, than the initial product itself. The foregoing is equally true with respect to products derived from waste lignin solutions from pulp mills. However, the advantages in this respect are many-fold since not only is a valuable product obtained, but also the effluent stream has been improved colorwise, i.e., has had the non-easily biodegradable lignin removed therefrom. Moreover, other condstituents, namely the aromatic compounds, have also been removed. This is an important feature of the invention since the aromatic compounds are toxic to most organisms which are responsible for the biodegradation of waste organic matter and accordingly retard the natural process of biodegradation.

The process, more specifically, entails the following general steps. An assay of the aqueous lignin solution is made to determine the "Total Organic Carbon" (TOC) of the ingredients contained therein. This assay can be made utilizing various apparatus which are designed for the purpose such as Total Organic Carbon Analyzer, Beckman Model 915. This "TOC" value provides the basis for determining the amount of water-soluble polyvalent cation salt which will be added after a proper pH of the aqueous lignin system has been assured.

The aqueous lignin system is then subjected to a pH analysis and the system is appropriately adjusted with either acid (mineral acid) or base (alkali-metal hydroxide) to insure that the pH is basic. The pH should be from about 8.5 to about 13, and preferably from about 9.5 to about 10.5.

To the basic lignin medium is then added a sufficient quantity of a water-soluble polyvalent cation salt, the cation of which will react under the conditions which exist with the ingredients of the aqueous solution, primarily the lignins, the lignin derivatives and the aromatics to produce a water-insoluble precipitate which can be separated from the remaining solution. The amount of polyvalent metal cation salt added, as indicated earlier, is dependent upon the "TOC" assay. The amount added should be sufficient to provide a weight ratio of the polyvalent cation to "TOC" of from about 1:8 to about 1:1. Using the parameters for reaction, i.e., pH and concentration of polyvalent metal cation salt, the precipitate obtained is easily separated from the remaining aqueous supernatant by standard techniques, i.e., filtration, centrifuge, etc.

The polyvalent metal cations which effectuate the necessary precipitation are the polyvalent cations such as calcium, magnesium, iron, zinc, aluminum and chromium. Any water-soluble salts of these metals are operable for the purpose and as exemplary are the inorganic salts such as the chlorides, bromides, fluorides, iodides, hydroxyls, nitrates, etc. salts of the respective metals.

After separation of the precipitate from the supernatant, the precipitate is acidified with an acid solution preferably of the mineral acids, i.e., sulfuric, hydrochloric, nitric and phosphoric acids, to produce a pH of from about 0 to about 3 and preferably from about 1 to about 2. The resulting medium is then allowed to stand for a short period ranging from 1 minute to about 48 hours to permit digestion of the medium.

The precipitate formed is separated from the supernatant by filtration or centrifugation, and then treated with a basic solution of an alkali metal, ammonium and/or lithium compound in an amount sufficient to produce a pH of from about 9 to about 13 and preferably from about 10.5 to about 12.5. The metal compounds which are utilized to produce the basic pH are compounds such as sodium hydroxide, sodium carbonate, potassium hydroxide, potassium carbonate, ammonium hydroxide, ammonium carbonate, lithium hydroxide, lithium carbonate, etc. The aqueous basic solution which is obtained contains the product of the invention.

The product obtained has been found to be quite effective in controlling scale formation in aqueous systems, namely steam producing systems (boiler water systems) and cooling water systems, when added to these systems in an amount of 1 to 100, and preferably from about 5 to 50, parts per million parts of the aqueous system. Scale in the above sense means deposits due to calcium and magnesium carbonate, silicate, phosphates, etc. and of course combinations thereof.

SPECIFIC EMBODIMENTS

The following specific examples of the inventive subject matter are included only as illustrative thereof and therefore are not to be construed as limitative thereof.
Basic Procedure The following is a basic procedure which was used in the preparation of the products of the Examples. The specific Examples set forth the deviations from the basic procedure, if in fact this is the case. Otherwise, the procedure utilized was the same.

The lignin containing aqueous system is preferably filtered to remove suspended solids. The liquor then obtained is subjected to an assay for Total Organic Carbon (TOC). The pH of the liquor is then measured and adjusted with acid or base, if necessary, to insure a pH of from about 9.5 to about 11.5.

To the alkaline or basic liquor is added an aqueous solution of a water-soluble salt of a polyvalent cation which will react with a significant portion of the organic matter under the conditions existant to produce a precipitate. The amount of solution added must be sufficient to provide a weight ratio of the polyvalent cation to the "TOC" of from about 1:8 to 1:1.

After precipitation occurs, the resulting suspension is centrifuged to remove the precipitated material. The solid material obtained is then suspended in a dilute hydrochloric acid solution and the pH adjusted with acid (HCl) to insure a pH of 0 to 3. After a short digestion, the acidified suspension is then centrifuged or filtered and the solid portion retained. The solid product (lignin, lignin derivatives and aromatics) now in the hydrogen form is dissolved in a basic solution (sodium hydroxide) in such quantity as to produce a pH of about 11. Any suspended matter is then filtered and the filtrate contains the product of the invention. "PPM Carbon" stated in the Examples refers to the Total Organic Carbon analyses of the soluble materials mentioned.

EXAMPLE 1

A Kraft process black liquor consisting of 80% softwood and 20% hardwood analyzed at 3,985 ppm of carbon (TOC). This was treated with a solution of calcium chloride containing 800 ppm of calcium at a pH of 10. This was followed by the general scheme outlined above with acidification at pH of 1.0.

EXAMPLE 2

A pinewood caustic extract from a Kraft mill analyzing at 1,830 ppm of carbon (TOC) was treated with a calcium chloride solution at 600 ppm of calcium. After the first centrifugation, the filtrate contained 1,320 ppm of carbon. The calcium chloride treatment was carried out at a pH of 11.5. Acidification to give the hydrogen form was carried out at a pH of 1.0.

EXAMPLE 3

A Kraft hardwood black liquor analyzed at 7,200 ppm of carbon (TOC) was treated with a calcium chloride solution at 2,000 ppm calcium, pH = 11.0. Acidification was carried out at a pH of 1.5.

EXAMPLE 4

A hardwood caustic extract analyzed at 1,000 ppm carbon (TOC) was treated with calcium chloride containing 520 ppm calcium at a pH of 11.0. After the first centrifugation the filtrate contained 940 ppm carbon (TOC). Acidification was carried out at a pH of 1.5.

EXAMPLE 5

Polyfon H is a partially desulfonated lignin product manufactured by Westvaco. A solution of this product contained 10,100 ppm carbon (TOC) and this was treated with calcium chloride solution containing 1,600 ppm calcium. pH of the treatment was 11.0. After centrifugation, the filtrate contained 3,180 ppm carbon (TOC). Acidification took place at a pH of 1.5.

EXAMPLE 6

Polyfon F is a sulfonated lignin product manufactured by Westvaco with 8 times the sulfonation of Polyfon H. A solution of Polyfon F was made up at 6,400 ppm of carbon (TOC) and this was treated with calcium chloride at 2,000 ppm calcium at a pH of 11.0. The resulting filtrate after centrifugation had 3,950 ppm of carbon (TOC). Acidification was carried out at a pH of 1.5.

EXAMPLE 7

Maracell A is a lignosulfate which is largely desulfonated, manufactured by American Can Company. A solution of Maracell A was made up at 3,284 ppm of carbon (TOC) and was treated with calcium chloride at 800 ppm calcium at a pH of 11.0. The residual carbon in the filtrate after centrifugation was 2,680 ppm carbon (TOC). Acid exchange was carried out at a pH of 1.5.

In order to establish that the products obtained by the procedures set forth in Examples 1 through 7 were significantly different from the starting materials, the starting materials and the products derived therefrom were subjected to various analyses to establish the differences. The results of these established quite conclusively (1) that the respective materials were quite different chemically, (2) the procedure quite effectively removed the "general aromatics" and specifically the "phenols" from the starting material, and (3) the color of the discharge liquor after separation from the precipitate was much lower than the original starting material and therefore much more acceptable.

The latter two results are quite significant since as earlier stated the waste lignin materials are objectionable from the standpoints of color and they are not easily biodegraded, a portion of which is attributed to the aromatic and phenol content which is toxic to the organism responsible for biodegradation. Therefore, the discharge liquor is more acceptable for discharge to receiving streams, lagoons, etc., thereby alleviating at least partially a very serious problem for pulp mills which are constantly seeking ways of disposing lignin wastes.

Table 1 which follows sets forth the results of the analytical studies.

TABLE 1

| Product or Material | Sulfur Content ($\times 10^{-4}$) | Analysis based on "C" content as ppm | |
|---|---|---|---|
| | | Phenol (%) | Aromatic (%) |
| Starting Material of Example 1 | 0.9 | 3.3 | 10.4 |
| Product of Example 1 | 4.4 | 6.3 | 19.5 |
| Starting Material of Example 2 | 4.9 | 2.8 | 12.9 |
| Product of Example 2 | 0.0 | 5.7 | 21.4 |
| Starting Material of Example 3 | 12.6 | 3.5 | 14.2 |
| Product of Example 3 | 7.1 | 5.3 | 18.9 |
| Starting Material of Example 4 | 8.0 | 2.9 | 13.0 |
| Product of Example 4 | 6.7 | 3.3 | 15.3 |
| Starting Material of Example 5 | 8.7 | 5.9 | 17.6 |
| Product of Example 5 | 2.6 | 7.4 | 21.6 |
| Starting Material of Example 6 | 35.0 | 5.7 | 18.8 |
| Product of Example 6 | 0.0 | 5.9 | 20.4 |
| Starting Material of Example 7 | 20.3 | 5.5 | 21.6 |
| Product of Example 7 | 0.6 | 6.6 | 26.5 |

Color Enhancement

In order to establish the color enhancement of the instant process, which is of utmost importance from the discharge and pollutional standpoints, optical density studies were conducted on the various starting materials, residual unprecipitated portions (solution remaining after precipitation by polyvalent cation) and final products made in accordance with the invention. This study, the data of which is recorded in the following Table 1A, clearly established that the colored ingredients of the starting products were removed and concentrated in the final utilizable product.

The procedure of the test utilized entailed: adjusting the pH of the respective samples to about 13.5, diluting 2 milliliter samples to 50 milliliters and measuring the optical density with a Spectronic 20 (Bausch & Lomb Company) at 540 nm. The optical density readings were normalized to constant Total Organic Carbon to insure that the values were on the same bases of organic material present.

TABLE 1A

| Material Tested | Optical Density TOC×10⁶ |
|---|---|
| Starting Material of Example 2 | 39.3 |
| Residual (after precipitation with CaCl₂) | 30.3 |
| Product of Example 2 | 110.2 |
| Starting Material of Example 3 | 47.7 |
| Residual | 31.0 |
| Product of Example 3 | 94.0 |
| Starting Material of Example 5 | 80.2 |
| Residual | 42.5 |
| Product of Example 5 | 80.8 |
| Starting Material of Example 7 | 50.2 |
| Residual | 49.2 |
| Product of Example 7 | 148.3 |

Precipitate Control Agent

In order to establish the effectiveness of the product derived, these products and additional products and the starting materials were tested to establish their respective capacities to control calcium phosphate formation and precipitation. The test procedure and the mediums utilized for this purpose are as follows.

Calcium Phosphate Tests

Filtered, deionized water (DI) is adjusted to a pH of 11.55 with 1N NaOH. The compound to be tested is added along with 0.6 ml of a 0.5 molar solution of Na₃PO₄ to a total volume of 199 mls. This solution is placed in a reflux apparatus consisting of a round bottom flask, condenser and heating mantle and brought to boiling. One ml of 0.5 molar calcium chloride solution is added and refluxing is continued for 5 minutes. The resulting suspension of calcium phosphate is cooled rapidly to room temperature and the total amount of precipitate measured by Coulter Counter.

Coulter Counter Measurement

The Model B Coulter Counter with the Model M volume converter is used with a 50 micron aperture tube with the time factor set to 8 and the division factor set to 1. 28 mls of the calcium phosphate suspension are added to 72 mls of DI water adjusted to a pH of 11.3 and 10 mls of 10% sodium chloride solution are added. The lower threshold is set at a particle diameter corresponding to a volume of 1.67 cu. microns and all particles larger than this value are measured. In a similar fashion, counts are made on the DI water and sodium chloride solution so that these can be subtracted from the experimental suspensions.

TABLE 2

| Treatment Product or Material | Parts per million required based upon "TOC" of Material or Product |
|---|---|
| Starting Material of Example 1 | 34 |
| Product of Example 1 | 6 |
| Starting Material of Example 2 | 19 |
| Product of Example 2 | 5 |
| Starting Material of Example 3 | 42 |
| Product of Example 3 | 20 |
| Starting Material of Example 4 | 38 |
| Product of Example 4 | 7 |
| Starting Material of Example 5 | 22 |
| Product of Example 5 | 10 |
| Starting Material of Example 6 | 11 |
| Product of Example 6 | 11 |
| Starting Material of Example 7 | 17 |
| Product of Example 7 | 8 |
| Maracell E (American Can) | 13 |
| Product prepared from Maracell E by Method of Example 1 | 7 |
| Americo X72Z-1 (American Can) | 10 |
| Product prepared from X72Z-1 by Method of Example 1 | 8 |

In testing various products, the above procedure is followed with different amounts of treatment and the total volume observed is plotted against dosage of treatment. From these plots the dosage required to produce 2 × 10⁵ cubic microns of particle volume is determined.

Scale Inhibition

In order to establish whether products derived by the present invention were effective as scale inhibitors in boiler water operations, various tests were conducted to produce a comparison of the Product derived in accordance with Example 2 with Maracell E, a commercial product sold for the purpose, and carboxymethylcellulose, also a commercial product sold for the purpose.

Two scale probes were used in each test to establish overall efficacy where conditions of temperature and flow of water in the system are encountered.

The respective ingredients or products are added to the boiler feedwater and the boiler put into operation. The operating conditions of the boiler system, i.e., consistency of boiler feedwater, temperatures, pressures, etc. were maintained constant to insure against variables. The "P" alkalinity of the feedwater was approximately 200 ppm and contained a silica content of 50 ppm. It was determined that at least 50 ppm of the Maracell E was necessary under the test conditions to provide some scale control. Accordingly, the data reflects this figure (carbonates, phosphates and silicates of the alkaline earth metals) when scraped from the probe surfaces.

TABLE 3

| Material or Product Tested | Treatment in ppm of feedwater | Milligrams of scale/ft$^2$ lower probe | upper probe |
|---|---|---|---|
| Product of Example 2 | 10 | 0.18 | 0.22 |
| Maracell E | 50 | 0.22 | 0.23 |
| Carboxymethylcellulose | 10 | 0.31 | 0.48 |

From the above data and obvious comparison, it is evident that the product derived from a waste caustic extract liquor from a softwood mill was much more effective than either of the commercial products, and in particular, the Maracell E which required five times as much to be equivalent for all practical purposes.

Inhibition of Calcium Silicate Formation and Deposition

The following test procedure was utilized to determine the effectiveness of the subject products in inhibiting the formation of calcium silicate.

Calcium Silicate Test

Distilled deionized water is adjusted to a pH of 11.3 with 1N NaOH. The compound to be tested is added along with 0.6 ml of a 1M solution of $Na_2SiO_3$ to a total volume of 99.5 mls. To this solution, 0.5 ml of 0.5M $CaCl_2$ solution is added drop by drop with gentle shaking. The resulting suspension of calcium silicate is allowed to stand for exactly 10 minutes before it is filtered through a microfilter of $0.2\mu$. The filtered solution is then analyzed for residual calcium ion concentration using EDTA titration method.

The materials and products tested in accordance with the above procedure together with the data ascertained are included in Table 4 which follows.

TABLE 4

| Product or Material Tested | Dosage based upon TOC (ppm) | % Ca++ remaining after 10 minutes |
|---|---|---|
| None | 0 | 43 |
| Product of Example 2 | 25 | 65 |
| Starting Material for Example 3 | 25 | 57 |
| Product of Example 3 | 25 | 58 |
| Starting Material of Example 5 | 25 | 57 |
| Starting Material of Example 6 | 25 | 60 |
| Starting Material of Example 7 | 25 | 59 |
| Starting Material of Example 1 | 40 | 57 |
| Product of Example 1 | 40 | 62 |
| Product of Example 2 | 40 | 73 |
| Starting Material of Example 3 | 40 | 59 |
| Product of Example 3 | 40 | 60 |
| Starting Material of Example 5 | 40 | 64 |
| Starting Material of Example 6 | 40 | 68 |
| Starting Material of Example 7 | 40 | 66 |

From the foregoing, it is evident that the products of the invention are effective in inhibiting the formation of calcium silicate. In some instances, they are more effective than the commercial products while in others they are comparable.

In view of the foregoing tests, the results of which are contained in Tables 2, 3 and 4, it is evident that the products of the subject invention are operable in controlling the formation of calcium and magnesium carbonates, silicates and phosphates and accordingly have utility in this respect in aqueous systems in general while scale-imparting salts are a problem, specifically in boiler and cooling water systems. If the products are added to the boiler and cooling systems in an amount of from about 1 to 100, and preferably 10 to 50 ppm either alone or in combination with other adjuncts, proper scale and deposit control can be maintained.

Accordingly, the present invention not only provides new products from existing ones, but also provides a method of producing valuable products from wastes which heretofore have caused a discharge and treatment problem because of content and color which is also improved by the inventive method.

Having thus described our invention, what is claimed is:

1. A method of producing a utilizable water-soluble product from an aqueous solution of a lignin derivative which comprises
    i. insuring that the aqueous lignin waste is at a pH of from about 8.5 to 13;
    ii. adding a sufficient quantity of a water-soluble salt of a polyvalent metal cation, the cations of which will react with said lignin derivative and thereby produce a water-insoluble precipitate, and separating the water-insoluble precipitate from the remaining supernatant solution;
    iii. acidifying the precipitate to a pH of from about 0 to 3 with a mineral acid solution; and allowing the resulting medium to digest for from about 1 minute to about 48 hours; and
    iv. contacting said precipitate with an aqueous alkaline solution of an alkali metal or ammonium compound in an amount sufficient to produce a solution having a pH of from about 9 to 13 and thereby solubilize precipitate.

2. A method according to claim 1 wherein the amount of salt added to said aqueous solution of lignin derivative is based upon the total organic carbon content of the solution and is added thereto in an amount to provide a weight ratio of the polyvalent cation to the total organic carbon of from about 1:8 to about 1:1.

3. A method according to claim 2 wherein the water-soluble salt of the polyvalent metal cation is a salt of a cation selected from the group of calcium, magnesium, iron, aluminum, zinc and chromium, said precipitate is acidified with an acid selected from the group of sulfuric, hydrochloric, phosphoric and nitric acids; and said basic solution of (iv) is a solution of potassium carbonate, potassium hydroxide, sodium carbonate, sodium hydroxide, ammonium hydroxide, ammonium carbonate, lithium hydroxide and lithium carbonate.

4. A method according to claim 2 wherein the pH of (i) is from about 9.5 to about 10.5, the pH of (ii) is from about 1 to about 2, and the pH of (iii) is from about 10.5 to about 12.5.

5. A method according to claim 4 wherein the water-soluble salt of the polyvalent metal cation is a salt of a cation selected from the group of calcium, magnesium, iron, aluminum, zinc and chromium; said precipitate is acidified with an acid selected from the group of sulfuric, hydrochloric, phosphoric and nitric acids; and said basic solution of (iv) is a solution of potassium carbonate, potassium hydroxide, sodium carbonate, sodium hydroxide, ammonium hydroxide, ammonium carbonate, lithium hydroxide and lithium carbonate.

6. A method according to claim 1 wherein the aqueous solution of the lignin derivative is the waste from a pulp mill.

7. A method according to claim 6 wherein the aqueous solution of the lignin derivative is adjusted in (i) to a pH of from about 8.5 to about 13, the precipitate in (iii) is acidified to a pH of from about 1 to about 3, and the pH of the basic solution in (iv) is from about 9 to about 13.0.

8. A method according to claim 7 wherein the amount of salt added to said aqueous solution of lignin derivative is based upon the total organic carbon content of the solution and is added thereto in an amount to provide a weight ratio of the polyvalent cation to the total organic carbon of from about 1:8 to about 1:1.

9. A method according to claim 8 wherein the pH of (i) is from about 9.5 to about 10.5, the pH of (ii) is from about 1 to about 2, and the pH of (iii) is from about 10.5 to about 12.5.

10. A method according to claim 9 wherein the water-soluble salt of the polyvalent metal cation is a salt of a cation selected from the group of calcium, magnesium, iron, aluminum, zinc and chromium; said precipitate is acidified with an acid selected from the group of sulfuric, hydrochloric, phosphoric and nitric acids; and said basic solution of (iv) is a solution of potassium carbonate, potassium hydroxide, sodium carbonate, sodium hydroxide, ammonium hydroxide, ammonium carbonate, lithium hydroxide and lithium carbonate.

\* \* \* \* \*